(12) United States Patent
Trimmer et al.

(10) Patent No.: US 10,245,666 B2
(45) Date of Patent: Apr. 2, 2019

(54) DRILLING TOOL FOR USE IN MACHINING A CONDUCTIVE WORK PIECE

(71) Applicant: General Electric Company, Schenectady, NY (US)

(72) Inventors: Andrew Lee Trimmer, Niskayuna, NY (US); Stephen Francis Rutkowski, Duanesburg, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 309 days.

(21) Appl. No.: 15/198,837

(22) Filed: Jun. 30, 2016

(65) Prior Publication Data

US 2018/0001406 A1 Jan. 4, 2018

(51) Int. Cl.
| B23H 9/00 | (2006.01) |
| B23H 9/16 | (2006.01) |
| B23H 3/04 | (2006.01) |
| B23H 9/10 | (2006.01) |

(52) U.S. Cl.
CPC ............... *B23H 9/16* (2013.01); *B23H 3/04* (2013.01); *B23H 9/10* (2013.01)

(58) Field of Classification Search
None
See application file for complete search history.

(56) References Cited

U.S. PATENT DOCUMENTS

| 3,276,988 A | * | 10/1966 | Williams | ............... | B23H 3/00 |
| | | | | | 174/46 |
| 4,448,661 A | * | 5/1984 | Roggen | ............... | C25C 3/20 |
| | | | | | 204/228.6 |
| 4,721,838 A | * | 1/1988 | Abdukarimov | ........ | B23H 9/006 |
| | | | | | 219/69.15 |
| 6,245,439 B1 | | 6/2001 | Yamada et al. | | |
| 7,416,652 B2 | | 8/2008 | Oelsch et al. | | |

(Continued)

FOREIGN PATENT DOCUMENTS

| CN | 103962661 A | 8/2014 |
| CN | 105543842 A | 5/2016 |

(Continued)

OTHER PUBLICATIONS

Lindstrom, Henrik et al.; "A New Method for Manufacturing Nanostructured Electrodes on Plastic Substrates"; American Chemical Society; vol. 1, Issue 2; Jan. 17, 2001; pp. 97-100.

(Continued)

*Primary Examiner* — Stefanie S Wittenberg
(74) *Attorney, Agent, or Firm* — GE Global Patent Operation; John Darling

(57) ABSTRACT

A drilling tool for use in machining a conductive work piece that includes a forward electrode tip including an outer radial portion and an inner radial portion. The outer radial portion includes a forward face, and the inner radial portion extends from the forward face of the outer radial portion. The drilling tool further includes a dielectric sheath that extends circumferentially about the outer radial portion, at least one side electrode coupled to the dielectric sheath, and a protective sheath that extends circumferentially about the dielectric sheath. An opening is defined in the protective sheath such that the at least one side electrode is at least partially exposed.

15 Claims, 4 Drawing Sheets

(56) References Cited

U.S. PATENT DOCUMENTS

| | | | |
|---|---|---|---|
| 8,663,450 B1 * | 3/2014 | Kathe | B23H 9/14 |
| | | | 204/224 M |
| 2007/0256939 A1 | 11/2007 | Wei et al. | |
| 2009/0134136 A1 * | 5/2009 | Graichen | B23H 5/04 |
| | | | 219/121.71 |
| 2010/0051475 A1 * | 3/2010 | Eto | B23H 3/04 |
| | | | 205/674 |
| 2013/0299035 A1 * | 11/2013 | Laurent | F16L 59/028 |
| | | | 138/147 |

FOREIGN PATENT DOCUMENTS

| | | | | |
|---|---|---|---|---|
| DE | 2649995 B2 | 3/1980 | | |
| DE | 19622918 A1 | 12/1997 | | |
| GB | 1200276 A | 7/1970 | | |
| WO | WO2013081000 | * | 6/2013 | B23H 3/04 |
| WO | WO2014091981 | * | 6/2014 | B23H 3/04 |

OTHER PUBLICATIONS

Yoo, Hyeon Kyu et al.; Development of a New Electrode for Micro-Electrical Discharge Machining (EDM) Using Ti(C,N)-Based Cermet; International Journal of Precision Engineering and Manufacturing; vol. 15, Issue 4; Apr. 2014; pp. 609-616.

* cited by examiner

DRILLING TOOL FOR USE IN MACHINING A CONDUCTIVE WORK PIECE

BACKGROUND

The present disclosure relates generally to electrochemical machining (ECM) and, more specifically, to a drilling tool for use in forming a continuous, variable geometry bore hole within a conductive work piece.

Rotary machines, such as gas turbines, are often used to generate power with electric generators. Gas turbines, for example, have a gas path that typically includes, in serial-flow relationship, an air intake, a compressor, a combustor, a turbine, and a gas outlet. Compressor and turbine sections include at least one row of circumferentially-spaced rotating buckets or blades coupled within a housing. At least some known turbine engines are used in cogeneration facilities and power plants. Engines used in such applications may have high specific work and power per unit mass flow requirements. Moreover, the efficiency of gas turbines is directly proportional to the temperature of exhaust gas discharged from the combustor and channeled past the rotating buckets or blades of the turbine. As such, the extreme temperatures of the exhaust gas generally require the static and rotating turbine airfoils to be manufactured from high temperature-resistant materials, and to include cooling features therein.

For example, turbine blades are typically cooled by channeling compressor discharge air through a plurality of cooling channels extending through the turbine blades. At least one known process of forming the cooling channels in the turbine blades is shaped-tube electrochemical machining (STEM). STEM is a non-contact electrochemical machining process that utilizes a conductive work piece (i.e., the turbine blades) as an anode, and an elongated drilling tube as a cathode. As the conductive work piece is flooded with an electrolytic solution, material is oxidized and removed from the conductive work piece near the leading edge of the drilling tube. STEM is generally effective at forming straight cooling channels having high aspect ratios within a conductive work piece, such as a turbine blade. Electrochemical machining techniques have also been developed for forming non-linear cooling channels within turbine blades. However, contact or rubbing sometimes occurs between a drilling tool and side walls of the cooling channels when guiding the drilling tool through the non-linear cooling channels, thereby decreasing the service life of the drilling tool. Moreover, at least some known turbine blades are fabricated from material that is not easily oxidized during an electrochemical machining process such that wear of the drilling tool is further exacerbated.

BRIEF DESCRIPTION

In one aspect, a drilling tool for use in machining a conductive work piece is provided. The tool includes a forward electrode tip including an outer radial portion and an inner radial portion. The outer radial portion includes a forward face, and the inner radial portion extends from the forward face of the outer radial portion. The drilling tool further includes a dielectric sheath that extends circumferentially about the outer radial portion, at least one side electrode coupled to the dielectric sheath, and a protective sheath that extends circumferentially about the dielectric sheath. An opening is defined in the protective sheath such that the at least one side electrode is at least partially exposed.

In yet another aspect, a drilling tool for use in machining a conductive work piece is provided. The tool includes an electrode assembly including a forward electrode tip that includes an outer radial portion and an inner radial portion. The outer radial portion includes a forward face, and the inner radial portion extends from the forward face of the outer radial portion. The electrode assembly further includes a dielectric sheath that extends circumferentially about a portion of the forward electrode tip, and at least one side electrode coupled to the dielectric sheath. A protective cap is positioned at least partially over the electrode assembly. The protective cap includes a first opening and a second opening defined therein such that the inner radial portion of the forward electrode tip and the at least one side electrode are at least partially exposed.

DRAWINGS

These and other features, aspects, and advantages of the present disclosure will become better understood when the following detailed description is read with reference to the accompanying drawings in which like characters represent like parts throughout the drawings, wherein.

Figure 1:
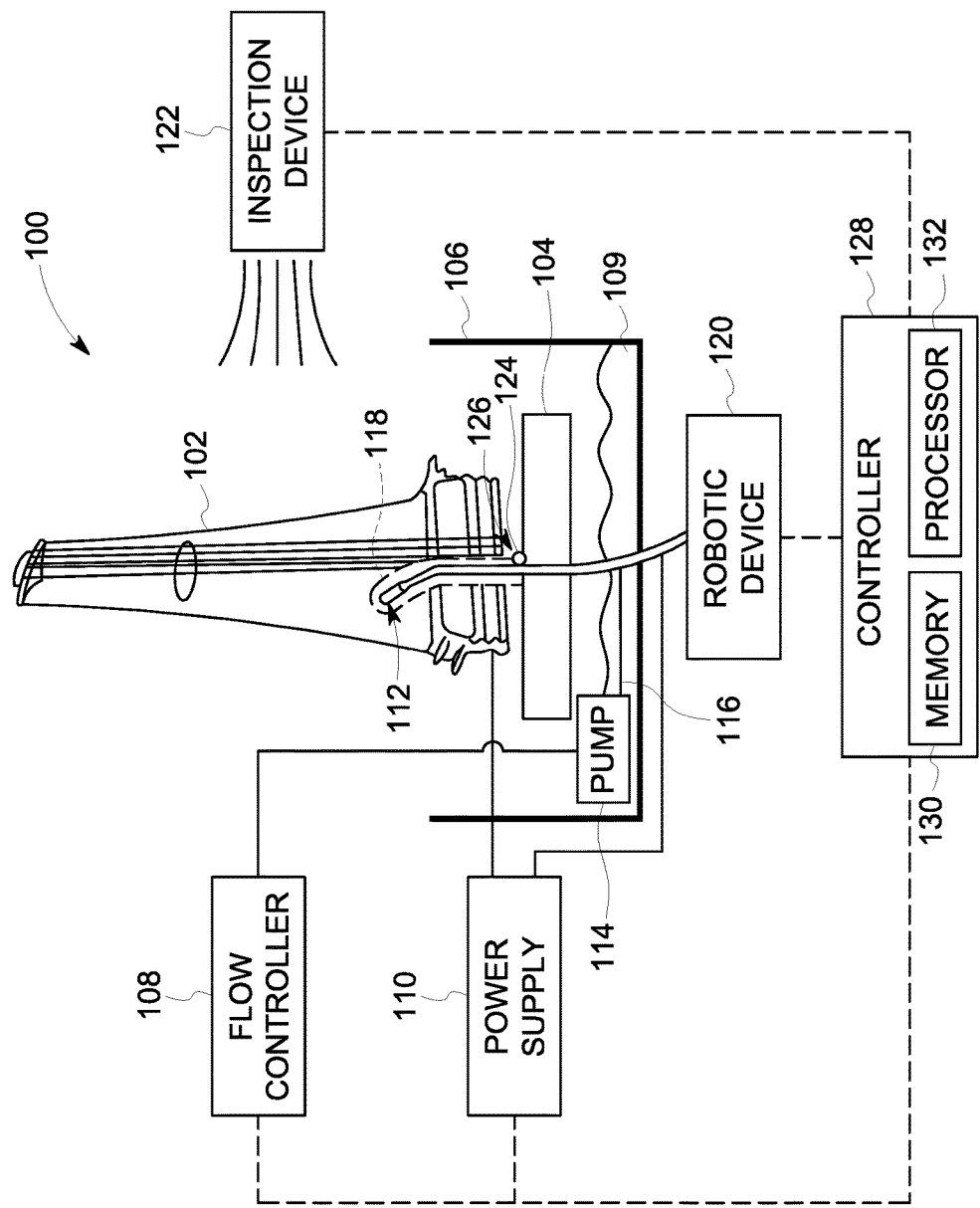
FIG. 1 is a schematic illustration of an exemplary electrochemical machining system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Embodiments of the present disclosure relate to a drilling tool for use in forming a continuous, variable geometry bore hole within a conductive work piece. More specifically, the drilling tool includes forward "top hat" electrode tip, a dielectric sheath that extends about the forward electrode tip, and at least one side electrode coupled to, and embedded within, the dielectric sheath. The forward electrode tip and the at least one side electrode are oriented and have a configuration that enables the drilling tool to form a continuous, variable-geometry bore hole within the conductive work piece. As used herein, "variable-geometry" refers to dimensional changes in more than one plane. The drilling tool further includes a protective element capable of withstanding abrasion and physical wear induced when the drilling tool is guided through and contacts side walls of the bore hole. For example, the protective element is embodied as either a protective sheath or a protective cap. The protective element is designed such that the electrodes of the drilling tool remain exposed for electrical communication with the conductive work piece while also reinforcing regions of the drilling tool susceptible to abrasion and physical wear. As such, the protective element facilitates increasing the service life and operability of the drilling tool.

FIG. 1 is a schematic illustration of an exemplary electrochemical machining (ECM) system 100 for machining a conductive work piece 102. In the exemplary embodiment, conductive work piece 102 is coupled to a mounting platform 104 positioned within an electrolyte container 106. As will be described in more detail below, a flow controller 108 facilitates discharging a flow of electrolytic fluid 109 from within electrolyte container 106 towards conductive work piece 102 during machining operations. In the exemplary embodiment, mounting platform 104 is positioned such that conductive work piece 102 is located above electrolytic fluid 109. Alternatively, mounting platform 104 is positioned such that conductive work piece 102 is at least partially submerged within electrolytic fluid 109, or electrolytic fluid 109 is supplied from a source remote from conductive work piece 102.

ECM system 100 includes a power supply 110 and a drilling tool 112 electrically coupled to power supply 110. More specifically, power supply 110 is electrically coupled to conductive work piece 102, which acts as an anode in the machining process, and to drilling tool 112, which acts as a cathode in the machining process. Material is removed from conductive work piece 102 when power supply 110 supplies electric current to drilling tool 112 forming an applied potential across conductive work piece 102 and drilling tool 112. Material removed from conductive work piece 102 by drilling tool 112 is flushed away by the flow of electrolytic fluid 109 discharged towards conductive work piece 102. More specifically, flow controller 108 is coupled to a pump 114, which facilitates supplying electrolytic fluid 109 to drilling tool 112 via a fluid supply line 116. As such, as will be described in more detail below, drilling tool 112 advances within conductive work piece 102 in more than one dimension along a tool path to form a bore hole 118 having a variable geometry that extends through conductive work piece 102 when the material is removed therefrom. More specifically, drilling tool 112 is capable of advancing within conductive work piece 102 in more than one dimension (i.e., in a non-linear direction).

ECM system 100 also includes a robotic device 120, or any suitable articulating member, coupled to drilling tool 112 that facilitates advancing drilling tool 112 along the tool path within conductive work piece 102. In the exemplary embodiment, robotic device 120 is any suitable computer numerically controlled device, such as a robotic end effector, that enables drilling tool 112 to be advanced along the tool path in a controlled and automated manner. More specifically, as will be explained in more detail below, robotic device 120 facilitates modifying an orientation of drilling tool 112 within bore hole 118, such that bore hole 118 formed within conductive work piece 102 has a variable geometry. Alternatively, the orientation of drilling tool 112 within bore hole 118 is modified without the use of robotic device 120, such as manually by an operator.

ECM system 100 may also include an inspection device 122 for performing non-destructive inspections of conductive work piece 102. Inspection device 122 is any non-destructive inspection device that enables ECM system 100 to function as described herein. Exemplary non-destructive inspection devices include, but are not limited to, an ultrasonic sensing device, an X-ray testing device, and a computed tomography (CT) scanning device. Inspection device 122 operates, either continuously or at predetermined intervals, to determine at least one of the orientation of bore hole 118 formed by drilling tool 112, or a position of drilling tool 112 along the tool path. As such, a position error of drilling tool 112 can be determined when the actual tool path is different from a nominal tool path of drilling tool 112.

In some embodiments, ECM system 100 includes an ion sensor 124 positioned proximate an outlet 126 of bore hole 118. As described above, material removed from conductive work piece 102 by drilling tool 112 is flushed away by the flow of electrolytic fluid 109 discharged towards conductive work piece 102. Ion sensor 124 measures an ion concentration in electrolytic fluid 109 discharged from outlet 126 of bore hole 118. In one embodiment, the ion concentration measurement is used to determine a chemical composition of electrolytic fluid 109, which facilitates determining the health or operational status of drilling tool 112. Alternatively, a learning algorithm embodied within a memory of a controller 128 is used to determine the health or operational status of drilling tool 112.

In the exemplary embodiment, flow controller 108, power supply 110, robotic device 120, inspection device 122, and ion sensor 124 are coupled in communication, by wired or wireless connectivity, with controller 128. Controller 128 includes a memory 130 (i.e., a non-transitory computer-readable medium) and a processor 132 coupled to memory 130 for executing programmed instructions. Processor 132 may include one or more processing units (e.g., in a multi-core configuration) and/or include a cryptographic accelerator (not shown). Controller 128 is programmable to perform one or more operations described herein by programming memory 130 and/or processor 132. For example, processor 132 may be programmed by encoding an operation as executable instructions and providing the executable instructions in memory 130.

Processor 132 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 132, cause processor 132 to perform at least a portion of the functions described herein. The above examples are exemplary only, and thus are not intended to limit in any way the definition and/or meaning of the term processor.

Memory 130 is one or more devices that enable information such as executable instructions and/or other data to be stored and retrieved. Memory 130 may include one or more computer-readable media, such as, without limitation, dynamic random access memory (DRAM), synchronous dynamic random access memory (SDRAM), static random access memory (SRAM), a solid state disk, and/or a hard disk. Memory 130 may be configured to store, without limitation, executable instructions, operating systems, applications, resources, installation scripts and/or any other type of data suitable for use with the methods and systems described herein.

Instructions for operating systems and applications are located in a functional form on non-transitory memory 130 for execution by processor 132 to perform one or more of the processes described herein. These instructions in the different implementations may be embodied on different physical or tangible computer-readable media, such as memory 130 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 128 to permit access and/or execution by processor 132. In an alternative implementation, the computer-readable media is not removable.

Figure 2:
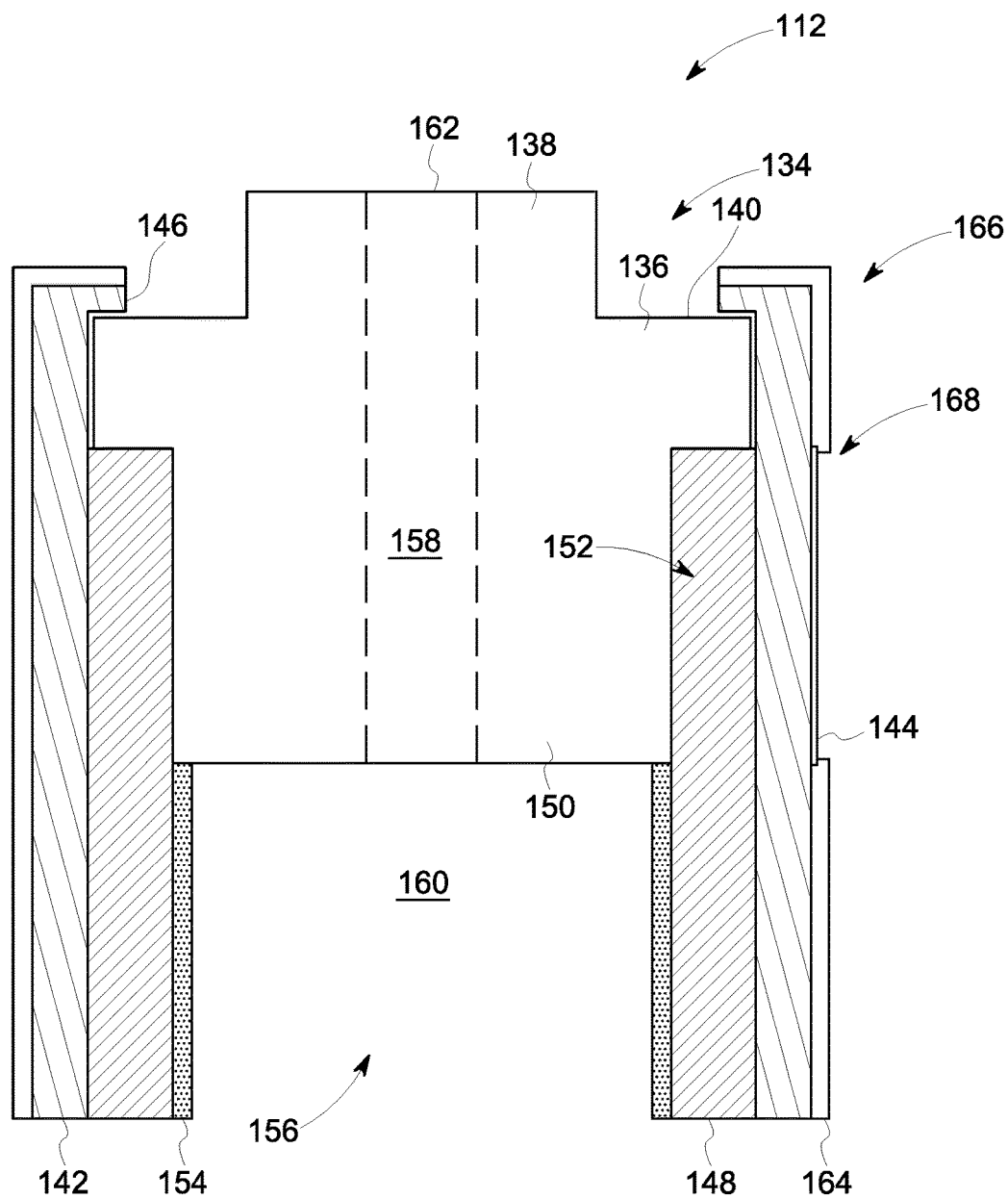
FIG. 2 is a cross-sectional view of an exemplary drilling tool that may be used with the electrochemical machining system shown in FIG. 1.

FIG. 2 is a cross-sectional view of drilling tool 112 that may be used with ECM system 100 (shown in FIG. 1). In the exemplary embodiment, drilling tool 112 includes a forward electrode tip 134 that includes an outer radial portion 136 and an inner radial portion 138. Inner radial portion 138 extends from a forward face 140 of outer radial portion 136. Extending inner radial portion 138 from forward face 140 extends the field of influence of the electric field generated by forward electrode tip 134 in a forward direction relative to drilling tool 112 when compared to a flat electrode having a similar amount of electric current supplied thereto. Extending the field of influence of the electric field generated by forward electrode tip 134 facilitates increasing material removal from conductive work piece 102 without having to increase an amount of electric current supplied to forward electrode tip 134. In addition, having an outermost portion of inner radial portion 138 positioned radially inward from outer radial portion 136 facilitates reducing contact between forward electrode tip 134 and conductive work piece 102 when bore hole 118 (shown in FIG. 1) curves within conductive work piece 102.

Drilling tool 112 also includes a dielectric sheath 142 that extends circumferentially about outer radial portion 136, and at least one side electrode 144 coupled to dielectric sheath 142. At least a portion 146 of dielectric sheath 142 extends beyond forward face 140 of outer radial portion 136. As such, when electric current is supplied to forward electrode tip 134, an electric field generated therefrom is forced to travel around portion 146 of dielectric sheath 142 prior to contacting the side walls of bore hole 118, which facilitates balancing the removal rate of material from conductive work piece 102 positioned closest to outermost portions of outer radial portion 136.

In an alternative embodiment, dielectric sheath 142 includes a recessed area (not shown) sized to receive the at least one side electrode 144. The recessed area is sized such that a radially outer surface of side electrode 144 is substantially flush with a radially outer surface of dielectric sheath 142. As such, side electrode 144 is embedded within dielectric sheath 142, and the likelihood of side electrode 144 from contacting the side walls of bore hole 118 is reduced.

Forward electrode tip 134 is oriented such that material adjacent to forward electrode tip 134 is removed from conductive work piece 102 when electric current is supplied to forward electrode tip 134. Removing material from conductive work piece 102 adjacent to forward electrode tip 134 enables drilling tool 112 to travel in a forward direction along the tool path of drilling tool 112. Moreover, the at least one side electrode 144 is oriented such that material oriented adjacent to the at least one side electrode 144 is removed from conductive work piece 102 when electric current is supplied to the at least one side electrode 144. Removing material oriented from conductive work piece 102 adjacent to the at least one side electrode 144 enables the tool path of drilling tool 112 to be directionally modified. As such, bore hole 118 (shown in FIG. 1) formed by drilling tool 112 that advances within conductive work piece 102 has a variable geometry. Further, forward electrode tip 134 and the at least one side electrode 144 may each be coupled to an independent power supply, such that material is removed from conductive work piece 102 at different rates. In one embodiment, power supply 110 has a plurality of channels that can be used to independently supply the forward electrode and at the at least one side electrode. Power supply 110 is capable of supplying a steady current, or may be pulsed in an on-then-off, or high-current-then-low-current-manner.

Drilling tool 112 also includes an electrically conductive sheath 148 coupled to forward electrode tip 134. Electrically conductive sheath 148 extends between dielectric sheath 142 and at least a portion of forward electrode tip 134. More specifically, forward electrode tip 134 includes a rear portion 150 having a smaller cross-section than outer radial portion 136 of forward electrode tip 134, thereby defining a circumferential indent 152 within forward electrode tip 134. As such, electrically conductive sheath 148 extends over rear portion 150 of forward electrode tip 134, and between circumferential indent 152 and dielectric sheath 142. Moreover, electrically conductive sheath 148 has a thickness that ensures forward electrode tip 134 is securely coupled within dielectric sheath 142. The thickness of electrically conductive sheath 148 is also selected to facilitate electrical bussing for forward electrode tip 134 with a high degree of flexibility. As such, electrically conductive sheath 148 allows sufficient electrical current to flow therethrough that facilitates removal of material from conductive work piece 102 while also having the flexibility to enable drilling tool 112 to make tight radius curves when forming bore hole 118.

A plurality of bussing wires (not shown) electrically couple the at least one side electrode 144 to power supply 110. As such, forward electrode tip 134 and the at least one side electrode 144 are selectively, and independently, operable to form bore hole 118 having a variable geometry that extends through conductive work piece 102 when material is removed therefrom. More specifically, in one embodiment, power supply 110 supplies a first electric current to forward electrode tip 134 at a first time, and supplies a second electric current to the at least one side electrode 144 at a second time that does not overlap with the first time. In another embodiment, power supply 110 supplies varying amounts of electric current to forward electrode tip 134 and the at least one side electrode 144 such that material adjacent thereto is removed from conductive work piece 102 at different rates. Further, in an alternative embodiment, power supply 110 supplies electric current to forward electrode tip 134 and the at least one side electrode 144 such that vaults or turbulations (i.e., a square-shaped waveform) are formed within bore hole 118.

In the exemplary embodiment, drilling tool 112 also includes a flexible guide member 154 coupled to and extending from forward electrode tip 134. Flexible guide member 154 facilitates guiding drilling tool 112 through bore hole 118 extending through conductive work piece 102. As described above, the forward electrode tip 134 and the at least one side electrode 144 are selectively operable such that bore hole 118 having a variable geometry extends through conductive work piece 102. As such, fabricating flexible guide member 154 from a flexible material enables drilling tool 112 to maneuver along a variable geometry tool path within conductive work piece 102. Exemplary flexible materials include, but are not limited to rubber, silicone, nylon, polyurethane, and latex. A flushing channel 156 extends through flexible guide member 154 and forward electrode tip 134 and, in operation, channels a flow of electrolytic fluid 109 (shown in FIG. 1) therethrough. More specifically, flushing channel 156 is formed from a first flushing channel 158 defined in forward electrode tip 134 and a second flushing channel 160 defined in flexible guide member 154. As such, electrolytic fluid 109 is channeled through second flushing channel 160 and first flushing channel 158, and discharged from a flushing aperture 162 defined in inner radial portion 138 of forward electrode tip 134 to flush material removed from conductive work piece 102.

Drilling tool 112 further includes a protective sheath 164 that extends circumferentially about dielectric sheath 142. Similar to dielectric sheath 142, protective sheath 164 also extends circumferentially about outer radial portion 136, and at least a portion of protective sheath 164 extends beyond forward face 140 of outer radial portion 136. As such, protective sheath 164 is strategically positioned at a wear region 166 generally defined between forward electrode tip 134 and side electrode 144. Moreover, dielectric sheath 142 and protective sheath 164 extend such that inner radial portion 138 remains at least partially exposed. As such, an electric field generated by forward electrode tip 134 is capable of extending from drilling tool 112 for interaction with conductive work piece 102 during operation of drilling tool 112.

Protective sheath 164 further includes an opening 168 defined therein such that side electrode 144 is also at least partially exposed. As such, an electric field generated by side electrode 144 is likewise capable of extending from drilling tool 112 for interaction with conductive work piece 102 during operation of drilling tool 112. In the exemplary embodiment, opening 168 is undersized relative to side electrode 144. Put another way, at least a portion of protective sheath 164 overlaps with side electrode 144. As such, protective sheath 164 facilitates retaining side electrode 144 against dielectric sheath 142.

Protective sheath 164 is fabricated from any material that enables drilling tool 112 to function as described herein. For example, in the exemplary embodiment, protective sheath 164 is fabricated from a dielectric material such that protective sheath 164 does not interfere with operation of forward electrode tip 134 and side electrode 144. Exemplary materials that may be used to fabricate protective sheath 164 include, but are not limited to, a silicone rubber material or a polyester material, such as high-density polyethylene terephthalate. In some embodiments, the polyester material is modified to include a strengthening additive for increasing the strength of the polymer. More specifically, in one embodiment, the polyester material is modified by filling interstitial spaces between monomers of the polymer chain of the polyester with the strengthening additive. An exemplary strengthening additive includes, but is not limited to, titanium dioxide, acrylics, ionomers, or modified polyolefins.

Figure 3:
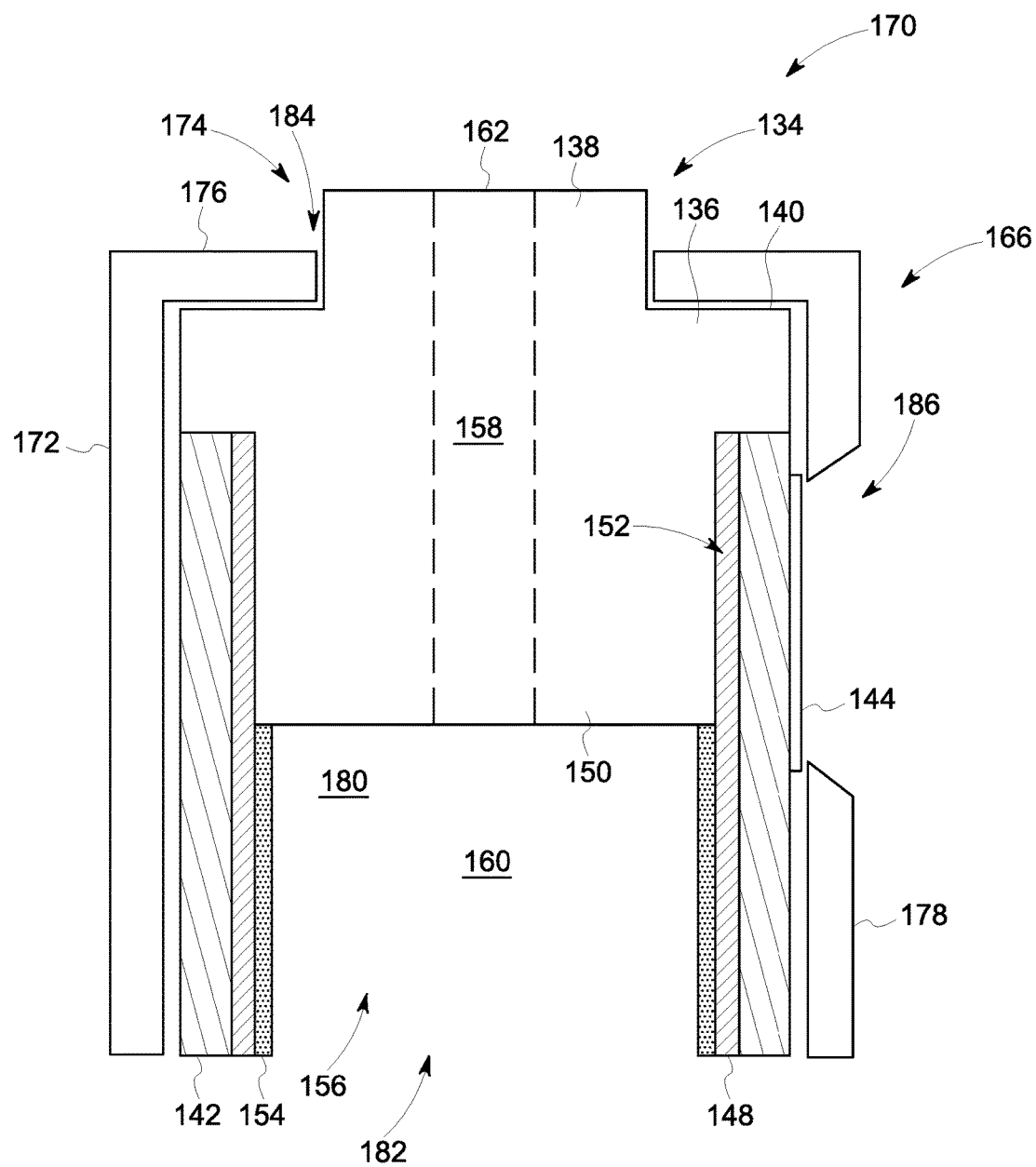
FIG. 3 is a cross-sectional view of an alternative drilling tool that may be used with the electrochemical machining system shown in FIG. 1.
Figure 4:
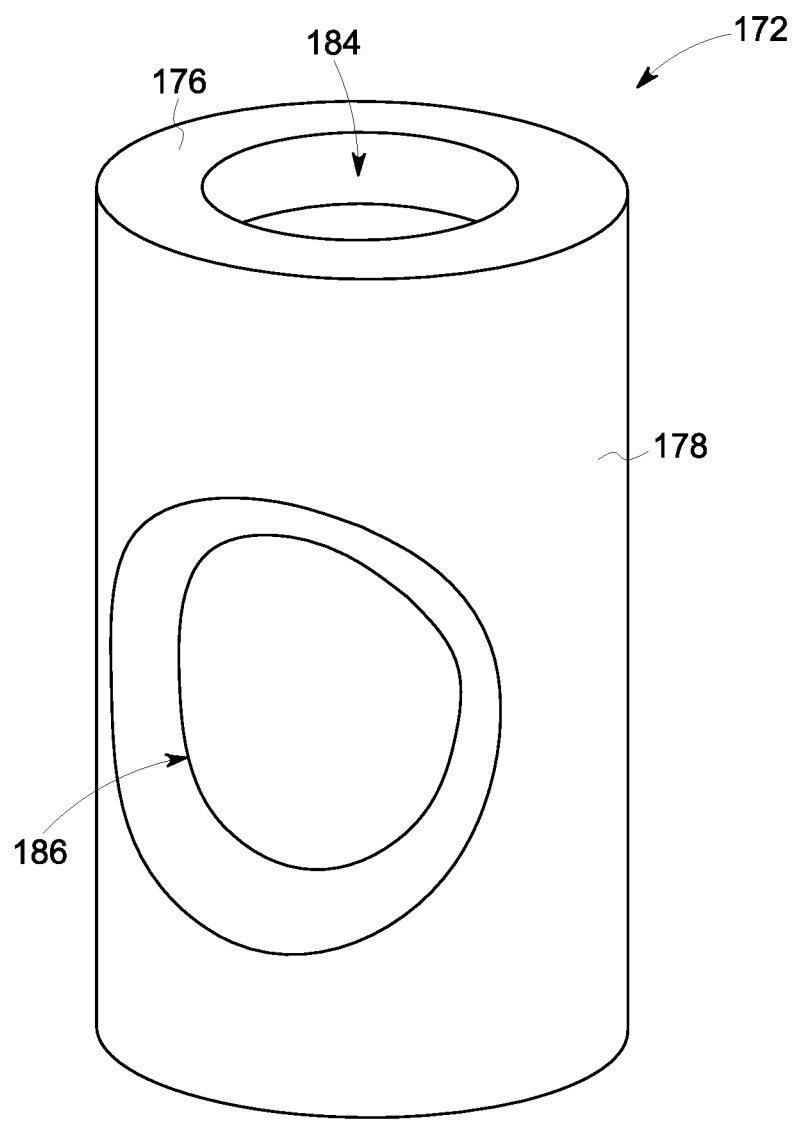
FIG. 4 is a perspective view of an exemplary protective cap that may be used with the drilling tool shown in FIG. 3.

FIG. 3 is a cross-sectional view of an alternative drilling tool 170 that may be used with the ECM system 100 (shown in FIG. 1), and FIG. 4 is a perspective view of an exemplary protective cap 172 that may be used with the drilling tool 170. In the exemplary embodiment, drilling tool 170 includes an electrode assembly 174 that includes forward electrode tip 134, dielectric sheath 142, and at least one side electrode 144. Drilling tool 170 further includes a protective cap 172 positioned at least partially over electrode assembly 174. More specifically, protective cap 172 includes a forward wall 176 and a side wall 178 that at least partially extend over wear region 166 generally defined between forward electrode tip 134 and side electrode 144. In addition, forward wall 176 and side wall 178 are oriented relative to each other for defining a hollow interior 180 within protective cap 172. Side wall 178 is further oriented such that protective cap 172 includes an open end 182 for providing access to hollow interior 180 therethrough. As such, electrode assembly 174 is insertable through open end 182 for positioning within hollow interior 180 when assembling drilling tool 170.

Protective cap 172 further includes a first opening 184 and a second opening 186 defined therein such that inner radial portion 138 of forward electrode tip 134 and side electrode 144 are at least partially exposed. As such, electric fields generated by forward electrode tip 134 and side electrode 144 are capable of extending from drilling tool 170 for interaction with conductive work piece 102 during operation of drilling tool 170. In the exemplary embodiment, first opening 184 is defined in forward wall 176 and second opening 186 is defined in side wall 178. First opening 184 is sized such that inner radial portion 138 is insertable through first opening 184. In one embodiment, inner radial portion 138 extends from forward face 140 of outer radial portion 136 by a distance such that inner radial portion 138 protrudes from protective cap 172 when inserted through first opening 184. As such, the field of influence of the electric field generated by inner radial portion 138 is not constrained by forward wall 176 of protective cap 172 during operation of drilling tool 170.

In addition, as described above, second opening 186 is defined within side wall 178 for at least partially exposing side electrode 144. Second opening 186 is undersized relative to side electrode 144 to facilitate retaining side electrode 144 against dielectric sheath 142. Moreover, electrode assembly 174 and protective cap 172 are rotationally fixed relative to each other such that side electrode 144 remains at least partially exposed at second opening 186 during operation of drilling tool 170. For example, in one embodiment, electrode assembly 174 and protective cap 172 are coupled to each other with an adhesive when assembling drilling tool 170. In an alternative embodiment, electrode assembly 174 and protective cap 172 are rotationally fixed relative to each other with a mechanical interlocking feature.

Moreover, as described above, forward electrode tip 134 includes rear portion 150 having a smaller cross-section than outer radial portion 136 of forward electrode tip 134, thereby defining circumferential indent 152 within forward electrode tip 134. In the exemplary embodiment, circumferential indent 152 receives electrically conductive sheath 148 and dielectric sheath 142. More specifically, electrically conductive sheath 148 and dielectric sheath 142 extend over rear portion 150 of forward electrode tip 134, and between circumferential indent 152 and side wall 178 of protective cap 172 to facilitate fitting electrode assembly 174 within hollow interior 180. In an alternative embodiment, dielectric sheath 142 extends at least partially over outer radial portion 136 for further dielectrically separating forward electrode tip 134 and side electrode 144.

Protective cap 172 is fabricated from any material that enables drilling tool 170 to function as described herein, such as any dielectric material with suitable abrasion resistance characteristics. For example, protective cap 172 may be fabricated from a ceramic material, a polymeric material, or a composite material including a combination of ceramic material and polymeric material. In the exemplary embodiment, protective sheath 164 is fabricated from a dielectric ceramic material such that protective cap 172 does not interfere with operation of forward electrode tip 134 and side electrode 144. An exemplary material that may be used to fabricate protective cap 172 includes, but is not limited to, an aluminum oxide material.

In one embodiment, protective cap 172 is formed by machining a solid piece of dielectric material into a desired shape and/or having desired features, such as hollow interior 180, first opening 184, and second opening 186. Alternatively, protective cap 172 is formed via an additive manufacturing technique.

An exemplary technical effect of the system and methods described herein includes at least one of: (a) increasing the wear resistance of an ECM drilling tool; (b) increasing the service life of the ECM drilling tool; and (c) facilitating greater turbine efficiency through the formation of non-linear cooling channels in a conductive work piece, such as a turbine blade.

Exemplary embodiments of an ECM drilling tool and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine assembles and related methods as described herein. Rather, the exemplary embodiment can be implemented and utilized in connection with many applications where forming non-linear holes in a conductive work piece is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A drilling tool for use in machining a conductive work piece, said drilling tool comprising:
    an electrode assembly comprising:
        a forward electrode comprising an outer radial portion and an inner radial portion, said outer radial portion comprising a forward face, and said inner radial portion extending from said forward face of said outer radial portion;
        a dielectric sheath that extends circumferentially about a portion of said forward electrode; and
        at least one side electrode coupled to said dielectric sheath; and
    a protective cap positioned at least partially over said electrode assembly, said protective cap comprising a first opening and a second opening defined therein such that said inner radial portion of said forward electrode and said at least one side electrode are at least partially exposed, wherein at least a portion of said protective cap extends beyond said forward face of said outer radial portion, wherein said protective cap comprises a forward wall and a side wall that at least partially extend over a wear region generally defined between the forward electrode and the at least one side electrode, and wherein said first opening is defined in said forward wall and said second opening is defined in said side wall.

2. The drilling tool in accordance with claim 1, wherein said protective cap is fabricated from a dielectric ceramic material.

3. The drilling tool in accordance with claim 1, wherein said first opening is sized such that said inner radial portion of said forward electrode is insertable through said first opening.

4. The drilling tool in accordance with claim 3, wherein said inner radial portion extends from said forward face of said outer radial portion by a distance such that said inner radial portion protrudes from said protective cap when inserted through said first opening.

5. The drilling tool in accordance with claim 1, wherein said second opening is undersized relative to said at least one side electrode.

6. The drilling tool in accordance with claim 1, wherein said electrode assembly and said protective cap are rotationally fixed relative to each other.

7. The drilling tool in accordance with claim 1 further comprising an electrically conductive sheath coupled to said forward electrode, wherein said forward electrode comprises a circumferential indent configured to receive said electrically conductive sheath and said dielectric sheath.

8. The drilling tool in accordance with claim 7 further comprising:
   a flexible guide member coupled to and extending from said forward electrode; and
   a flushing channel extending through said flexible guide member and said forward electrode, said flushing channel configured to channel a flow of electrolytic fluid therethrough.

9. The drilling tool in accordance with claim 8, wherein said electrically conductive sheath extends along at least a portion of said flexible guide member.

10. The drilling tool in accordance with claim 1, wherein the dielectric sheath extends circumferentially about the outer radial portion.

11. The drilling tool in accordance with claim 1, wherein said protective cap is fabricated from one of a silicone rubber material or a polyester material.

12. The drilling tool in accordance with claim 11, wherein the polyester material is modified to include a strengthening additive.

13. The drilling tool in accordance with claim 12, wherein the strengthening additive comprises titanium dioxide, acrylic, ionomers, or polyolefins.

14. The drilling tool in accordance with claim 2, wherein said protective cap is fabricated from aluminum oxide.

15. The drilling tool in accordance with claim 1, wherein said protective cap is fabricated from a combination of ceramic material and a polymeric material.

\* \* \* \* \*